United States Patent [19]

Muskulus

[11] 4,221,243
[45] Sep. 9, 1980

[54] DEVICE FOR WINDING STATORS OR THE LIKE

[75] Inventor: Willi Muskulus, Frankfurt, Fed. Rep. of Germany

[73] Assignee: Balzer & Droll KG, Niederdorfelden, Fed. Rep. of Germany

[21] Appl. No.: 14,546

[22] Filed: Feb. 23, 1979

[30] Foreign Application Priority Data

Feb. 24, 1978 [DE] Fed. Rep. of Germany ....... 2808048

[51] Int. Cl.$^2$ ................................................ B21F 3/04
[52] U.S. Cl. .................................... 140/92.1; 140/112
[58] Field of Search ...................... 140/92.1, 92.2, 112

[56] References Cited

U.S. PATENT DOCUMENTS 3,625,261  12/1971  Hill et al. ............................. 140/92.1
3,973,601  8/1976   Arnold et al. ....................... 140/92.1

*Primary Examiner*—Lowell A. Larson
*Attorney, Agent, or Firm*—Larson, Taylor and Hinds

[57] ABSTRACT

Apparatus for winding stators or the like includes a winding form and a winding nozzle, rotatable about the form, for winding a wire on the form. A collecting tool or transfer tool is provided for receiving windings from the form, a stripper is provided to strip windings from the form onto the collecting tool and a clamping means is provided for clamping a wire between individual winding operations. The apparatus includes means for simultaneously moving the winding nozzle, stripping means and clamping means during the stripping of the windings from the form onto the collecting tool. Thus, the wire from the last-wound windings will be prevented from being drawn to a finer diameter when stripped from the form or it will not be necessary to pull additional wire out of the winding nozzle in which event, on starting the next winding process, there would be a strong jerk which could result in breakage.

13 Claims, 5 Drawing Figures

DEVICE FOR WINDING STATORS OR THE LIKE

FIELD OF THE INVENTION

The invention relates to a device for winding stators of electric machines, comprising a winding nozzle rotatable about a form, a transfer or collecting tool that is brought by axial relative motion into engagement with the form, said tool accepting the windings wound on said form, a stripper for stripping the windings on the form after a winding process, from said form onto the transfer or collecting tool, and a device disposed behind the winding nozzle in the draw-off direction of the winding wire, for clamping the wire between individual winding operations.

The advantages of increasing automation, in known winding devices of this kind, are cancelled out in part by the extraordinary construction outlay that is associated with automation, as well as by the increased susceptibility to disturbance in many instances. This makes the presence and attention of an operator constantly necessary, just as before.

The susceptibility to disturbance, and a relatively high rejection rate in automated winding and collecting devices are primarily attributable to the circumstance that the winding wire is a light, flexible, readily damaged element which, moreover, tends to become jammed on itself in the pushing of a plurality of windings through a narrow slit. The problem, therefore, is to guide the wire by a tool part that grasps it very securely and precisely in every phase, whereby in practice, the necessary capability of the tools to adapt to different stator sheet packets and/or windings is to be regarded as an impediment, since particularly in transition from one work step to the next and then again primarily after a changed setting of individual tool parts, difficulties arise. A truly automatic operation requires therefore not only a special control, but particularly precision and uniformity of predetermined relative positions of the tool parts as well as of the working and shifting paths, whereby an adroit selection of guide movements can substantially reduce the requirements for expensive precision and structural outlay.

The invention is concerned with the problem of improving the cooperation of winding and receiving tools of a device of the described type in the sense of the above remarks, so that the winding wire may be guided with greater precision than heretofore, and thereby become damaged less often.

BRIEF SUMMARY OF THE INVENTION

The problem is solved according to the invention in that in the stripping of the windings onto the transfer or collecting tool after a winding process, the winding nozzle and the clamping device are movable together with the stripper.

By this proposed measure, in contrast to previously known winding devices in which the winding nozzle and the clamping device are stationary during the stripping, in the present process, the wire from the last-wound windings will be prevented from being drawn back and thereby made smaller and/or more wire will be prevented from being pulled out of the winding nozzle whereby in the startup of the next winding process, there would be a stong jerk that could lead to rupture of the wire.

The common axis of the stipper, winding nozzle and clamping device in the present invention entails no structural complication, because a single drive, e.g. a cam control, power cylinder, or electric motor with worm-gear spindle, will suffice.

DETAILED DESCRIPTION

In known machines, it is provided that the stripper will be moved during the stripping process over the free end of the form, which in this phase is moved out into the transfer or collecting tool. This design of the stripper path has a number of drawbacks. In view of automation, it is disturbing that with forms of different length, there will also be stripping strokes of different lengths, complicating the control. There is the further drawback that both on the sides of the form and on the sides of the collecting tool, the structural height makes itself noticed. To avoid these deficiencies, in a preferred embodiment of the device according to the present invention, it is proposed to have a collecting tool that comprises an inner ring of collecting lamellae and a concentric outer ring of cover strip lamellae, the stripper being movable independently of the structure and height of the form, along a uniform path until it is immediately behind the tips of the cover strip lamellae.

Heretofore it has been customary, in winding in a collecting tool that comprises collecting and cover strip lamellae, to have the collecting lamellae extend out beyond the cover strip lamellae by the height of the stator packet to be wound, or to have adjustable tools in case of packets of different heights, that extend over the cover strip lamellae by the height of the smallest stator sheet packet. The protruding collecting lamellae also affect the structural height and have the further important disadvantage of instability, with the result that there can be irregular slit widths and jamming of the wires in the slits. To counter this deficiency in the present invention, it is proposed that during the winding and stripping process, the free ends of the collecting lamellae be retracted to a position immediately above the free ends of the cover strip lamellae. This measure is advantageous, independently of the kind of stripping operation.

If stator sheet packets of different heights are to be wound, the width of the form must be variable (see for example German OS No. 26 08 658). Of course, the precision of the relative motion between the form and the transfer or collecting tool must not suffer from this. From the knowledge that what is particularly involved here is the precise positioning of the form part that is to be brought into engagement with the transfer or collecting tool, in another preferred embodiment of the invention in which the form comprises a multipart structure of variable cross section, it is provided that to change the width of the form, the part of the form that has to be engaged with the transfer or collecting tool can be locked, and the other part of the form can be moved by means of the winding nozzle drive shaft, which is movable crosswise, and a transmission gear, by double the length of the drive shaft path. With the described construction, the locking of the part of the form part that is directed to the transfer or collecting tool ensures its precise positioning while only the other part of the form and the turning shaft of the winding nozzle are movable. Even if the form is replaced, this does not entail any time-consuming aligning operations since the locking members thereby serve for centering.

A particularly simple and advantageous embodiment of the device of the invention can be obtained if the form part that is to be brought into engagement with the transfer or collecting tool is locked by a lock pin disposed next to it which can be introduced into the form part by axial relative movement, whereby advantageously the lock pin at the same time will effect a locking or clamping between the form parts. The advantage of this construction consists therein that a single very simple part, namely a locking pin, performs the various functions of securing position, bearing the reaction force, and control of the mutual clamping or locking of the form parts.

Disturbances in automatic operation thus far have also been caused by the circumstance that there was a rather long interruption in production when a wire supply ended, because there was difficulty in introducing the new wire supply through the guide passages and the winding nozzle. To avoid this difficulty, it is now proposed that there be a joining or welding device upstream of the winding nozzle in the draw-off direction of the winding wire, for joining the end of a wire supply to the beginning of the next wire supply. If the two wire ends are butt-welded together, there is no need for cumbersome threading in. Moreover, there is no unused length of wire left over.

The invention is discussed below with reference to an example of embodiment shown in the drawing.

Figure 1:
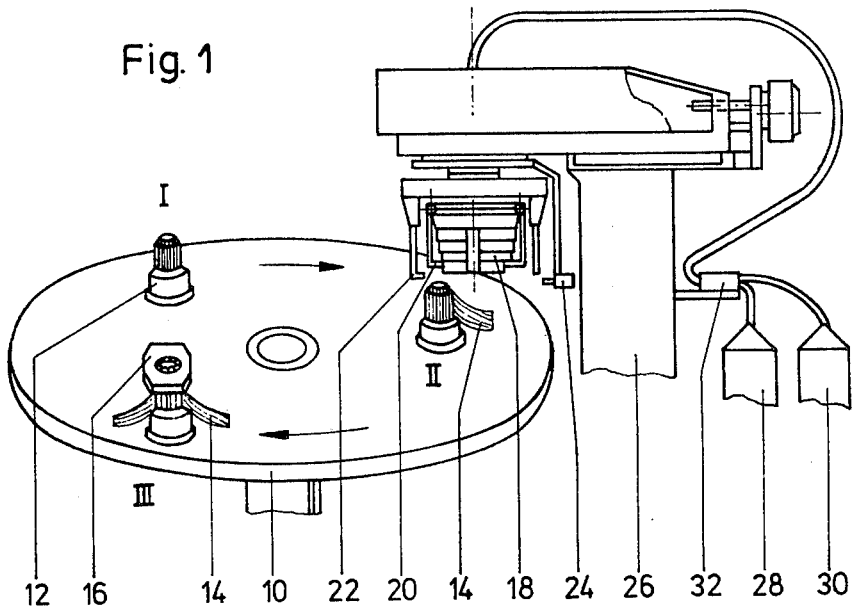
FIG. 1 shows a simplified perspective view of a device according to the invention.
Figure 2:
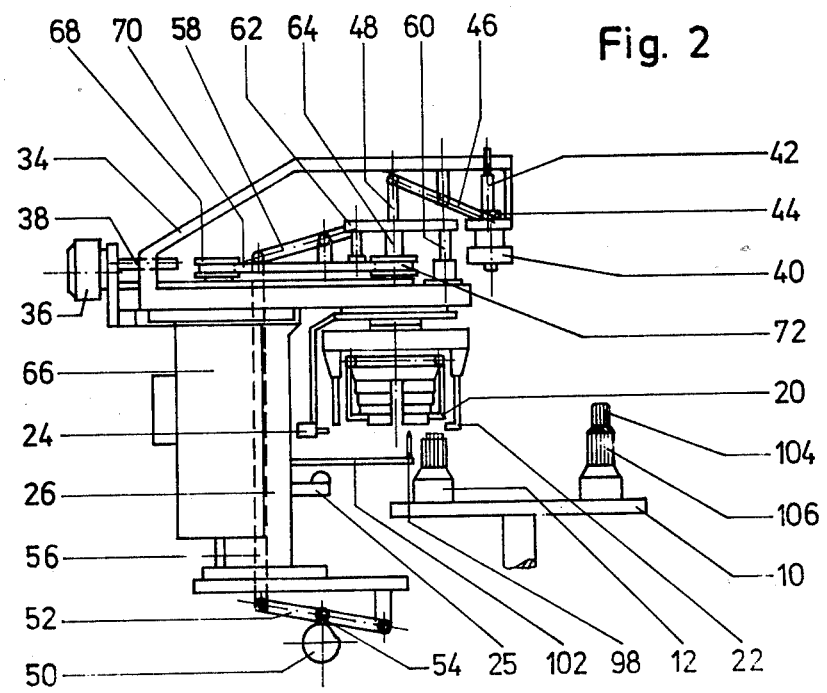
FIG. 2 is a side view of the device of FIG. 1.

FIGS. 1 and 2 show a winding device according to the invention, as part of an automatic winding and collecting unit, in which the windings for stators of electric machines are prewound and collected into stator sheet packets. Such automatic machines are described for example in German OS No. 26 08 658, U.S. Pat. No. 3,579,818 and German OS No. 1,938,184. The invention is not restricted to this customary construction of automatic device with a turntable, however. Since the invention is particularly concerned with the cooperation of the winding and collecting or transfer tool, it also relates to individual machines on which there is only winding, and not collection immediately thereafter. In the example of embodiment as in FIGS. 1 and 2, a turntable 10 is used as conveyor for the windings, from the winding device to a collecting station that is merely indicated as III. This turntable could obviously be replaced by a straight-line conveyor.

In the case of the present example, turntable 10 presents three known collecting tools 12 of the type described in detail, for example, in German OS No. 26 12 904; OS No. 20 62 153; German Gebrauchsmuster No. 69 14 572; German AS No. 20 01 677; and U.S. Pat. No. 3,324,536. Collecting tools 12 are moved by stepwise movements of the turntable, cyclically in succession into three positions. In position I, insulating cover strips that serve to close the stator grooves after the collecting of the windings are stored in a known way. In a second position II, wire windings 14 are produced and transferred to collecting tool 12. In a third position III, finally, windings 14 are collected into stator plate packets 16, the operation being as described in the cited prior publications.

The present invention relates to the winding station of position II. The winding tool shown there is a multipart form 18 with strippers 20 as described in more detail in German OS No. 23 09 837 and OS No. 23 19 651. A winding nozzle 22 rotates about form 18 and thereby produces windings on a single or multistage form 18, which windings, even during the winding process, are thrust down by short axial reciprocating movements of stripper 20 into collecting tool 12 which is engaged with form 18 during winding. As described in the cited prior publications, the stripper drive can be a wobble plate. Forms like those of German AS No. 15 89 860 can also be utilized.

During the winding, form 18 is intermittently lowered and thereby penetrates more and more deeply into collector tool 12, while winding nozzle 22 always rotates in the same plane. The strippers also remain at the same level throughout the winding operation and successively thrust the individual windings of the various stages of form 18 into different slits between the vertical lamellae of collector tool 12, which are disposed in a ring. After the prescribed number of windings has been produced on the individual stages of form 18, while the form is engaged with the lamellae of collecting tool 12, the stripper 20 must in a known way execute a motion relative to form 18 out beyond its upper edges, in order to strip off the windings still remaining on the form at the end of the winding process.

Furthermore, in the basic construction, a device designated 24 in FIG. 1 is known, for clamping and cutting the winding wire after the winding of all the windings to be received by a collecting tool 12 in position II, or depending upon the type of winding of the motor that is to be produced, after production of a single group of windings. In machines that are on the market under the trademark and model number STATOMAT RWA1Z, the clamping and cutting device is mounted on the frame of the machine. In the example of embodiment of the invention according to FIGS. 1 and 2, on the contrary, device 24 is non-rotatably mounted on the bearing of winding nozzle 22, but it is axially movable together with winding nozzle 22. Alternatively, only a clamping device may be provided at 24, which presses the wire in the downward movement against a fixed blade 25 (FIG. 2) whereby the wire is cut.

As FIG. 1 also shows, the winding wire is drawn from a supply spool 28 next to the machine, and fed to winding nozzle 22. As a precaution, another supply spool 30 is in readiness next to it. When in the winding, wire supply 28 is entirely used up and for example the hindmost end of the wire is torn off from a loose connecting point on the support for the supply spool, the machine stops, and by means of a joining or welding device 32, the start of wire from supply spool 30 can be butt-welded to the end of the wire of spool 28. The weld can be isolated, but this is not an absolute requirement, and then the winding drive can run on again, without the necessity as before for threading the start of the wire from supply spool 30 through hoses and guide passages to winding nozzle 22. An especially good butt-weld connection between the two ends of wire that are to be joined is produced if in welding device 32, before the joining of the two opposedly directed and hence overlapping wires, separation or cutting is effected by a common cut at the same point, as in a film splicing press, and then the cut places are welded together.

The drive for the moving parts of the winding tool is shown schematically in FIG. 2. This shows a slidably guided carriage 34 which is slidable radially with reference to turntable 10 and collecting tool 12 into position II by means of a controllable motor 36 and a threaded spindle 38. Carriage 34 supports form 18 and a controllable motor 40 which acts on form 18 via a threaded spindle 42, a nut 44 which is held against rotation, a double-armed lever 46 borne on carriage 34, and a push rod 48 that is coaxial to the drive shaft of winding nozzle 22. The action is such that the movement will be axial, before and after the winding process as well as in the intermittent advance of the form during the winding, in transition from one to the next stage or chamber of form 18.

As axial drive for winding nozzle 22 and the clamping and cutting device 24 which is rotatable with the nozzle but fixed axially with respect to the nozzle, and stripper 20 which likewise is axially supported on the structure of winding nozzle 22, there is, in the case of the present example, a driven cam 50 that is rotatably borne in the lower part of the machine, said cam acting on a plate 62 that is vertically guided by guide columns 60 fixed on carriage 34, via a swingably mounted lever 52 with a pin 54 applied to cam plate 50, a rod articulatedly connected with lever 52, and a double-armed lever 58 borne on carriage 34 and articulatedly connected with rod 56. The movement of said plate 62 is transmitted via a push rod 64 to winding nozzle 22, stripper 20 and clamping and cutting device 24. Also, the tubular push rod 64, like push rod 48, is coaxially disposed with reference to the drive shaft of winding nozzle 20, whose drive is effected by a motor 66 via a pulled 68, a belt 70 and another pulley 72.

Obviously, instead of motor 40 with threaded spindle 42, and instead of cam drive 50, other appropriate drive means can be used, where especially also the axial drive for winding nozzle 22, stripper 20 and clamping and cutting device 24 can be mounted, like the axial drive for the form, on carriage 34.

Figure 3:
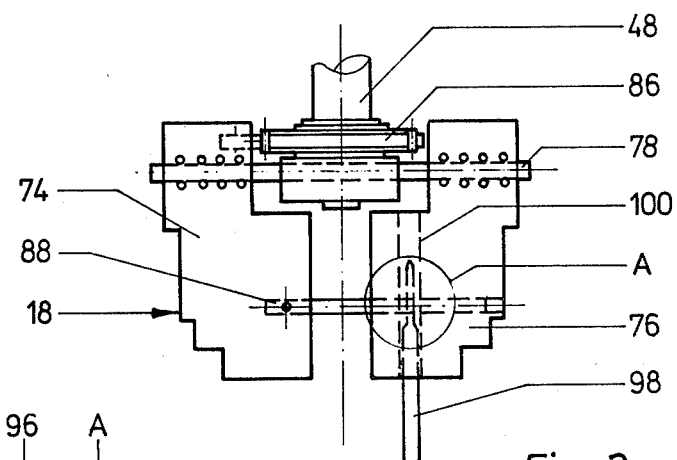
FIG. 3 is a vertical section through the form of the device according to FIGS. 1 and 2.
Figure 4:
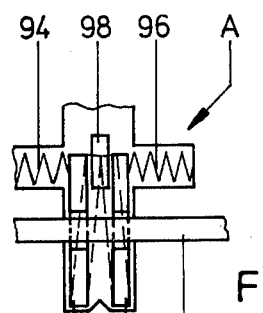
FIG. 4 shows a detail of FIG. 3 on a larger scale, in a plane turned by 90°.
Figure 5:
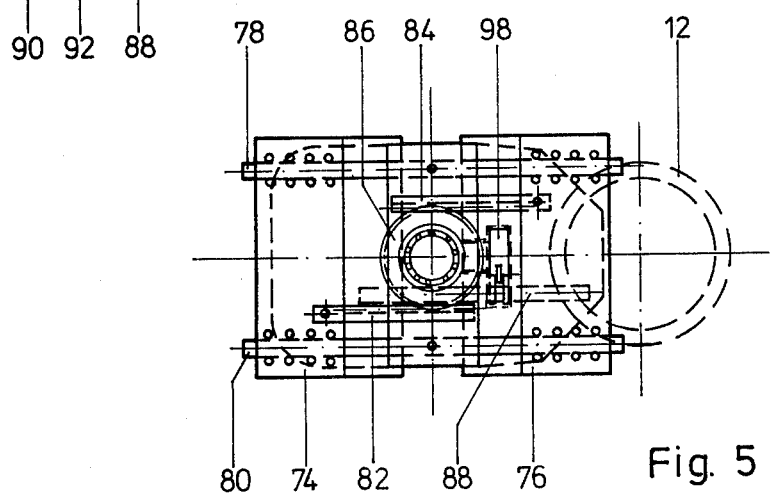
FIG. 5 is a top view of the form according to FIG. 3.

Drive 36 for carriage 34 is utilized to vary the width of form 18. Reference is made to FIGS. 3 to 5, in conjunction with FIG. 2.

In the case of the illustrated embodiment, form 18 comprises two parts 74 and 76 that are movable relative to each other. Both parts of the form are slidably guided in a transverse direction on two guide rods 78, 80 which are fixedly connected with push rod 48. In addition, on each form part 74, 76, there are fixed respectively opposed racks 82, 84 which, as shown in FIG. 5, engage a gear 86 that is mounted so as to be freely rotatable on push rod 48.

In order to keep the two form parts 74 and 76 in a specific relative position with a specific form width, there is a rod 88 fixed on form part 74, and on sides of form part 76 the known clamping device schematically shown in FIG. 4 which operates on the principle of a lift jack. For clamping rod 88, there are two plates 90, 92 set into form part 76 which are pressed by compression springs 94, 96 in a slanted position with reference to rod 88 which is taken through holes in plates 90, 92, whereby rod 88 is clamped in the said holes of plates 90, 92. To release this clamping, there is only need to introduce a pin 98 that is pointed at the tip, from below in hole 100 in form part 76, whereby the arrangement is such that pin 98 will penetrate between plates 90 and 92 (see FIG. 4) and direct them normal to rod 88, so that the clamping is released.

If carriage 34 is moved, with clamping of rod 88 released, while pin 98, which is disposed for example on the machine frame or turntable 10, locks form part 76 in the position of engagement according to FIG. 3, by cooperation of racks 82, 84 with gear 86, form part 74 will be moved in the same direction with reference to form part 76, but by double the path of carriage 34. In this way, the axis of rotation of winding nozzle 22 will retain its central position with reference to the form as a whole, independently of the change in form width. At the same time, pin 98 which is used for release of the clamping of the form parts ensures the position of form part 76 which is engaged with collecting tool 12 during the winding process. For this reason, it is advisable to fit the hole or recess 100 in form part 76 very accurately to the cross section of lock pin 98.

Since lock pin 98 is only used to change the form width and might disturb the winding operation in a position aligned with hole 100, it is advantageously disposed on a swingable or slidable holder 102, so that during the winding process, it can be removed from the working area of winding nozzle 22. As an alternative, there could be a temporary fastening for the lock pin next to the collecting tool 12 on turntable 10, said device to be manually releasable.

FIG. 2, with the different setting of the two illustrated collecting tools 12 on turntable 10, shows still another particular feature of the described form of embodiment of the invention. The collecting tools generally consist of collecting lamellae 104 disposed in a ring, and radially outside of them, another annular arrangement of cover strip lamellae 106 (see German AS No. 1,918,485). Normally in the known winding devices in which the windings are thrust directly into collecting tool 12, the collecting lamellae 104 project by about the height of the stator sheet packet above the free ends of cover strip lamellae 106, as shown in FIG. 2 in the righthand side of the two illustrated collecting tools 12. If collecting tools 12 are brought in this position under winding form 18, this entails not only the drawback of a greater structural height of the machine, but is has surprisingly been found that there is the further disadvantage that the collecting lamellae 104, from the pressure of the windings thrust between the lamellae, readily bend enough so that adjacent slits between the lamellae are narrowed to a critical degree and thereby the wire jams in the slits.

In the described form of embodiment of the invention, it is therefore provided that the collecting lamellae 104 are retracted for example to 5 to 12 mm into the ring of cover strip lamellae 106 during the winding and transfer process, as shown on the left of the two illustrated collecting tools 12 in FIG. 2. In this way, the structural height is diminished, the gap width between the collecting lamellae is kept more precisely, and in addition, there is the advantage that the stripper 20, in stripping the last windings from form 18 only has to move by a relatively short path downward, to move all the windings down below the level of the free ends of the cover strip lamellae. The positive thrusting in of the wire windings into the collecting tool to a point below the ends of the cover strip lamellae 106 protects the wires from being caught in the bent ends of cover strip lamellae 106.

In the described winding device, the axial thrust paths of form 18 and the unit comprising the winding nozzle 22, the strippers 20 and the clamping and cutting device 24 are so adjusted and timed with reference to each other that during the winding process, form 18 penetrates stepwise by the required amount into the lamellae of collecting tool 12, but the stripper 20 no longer, as before, is lowered to the lower end of form 18 that is in its lowermost position, but it travels downward only a short distance, to below the ends of the cover strip lamellae 106. While strippers 20 are then held at this level, form 18 is again pulled back up, whereby strippers 20 strip off from form 18 the windings that remain on the form, into the collecting tool 12. With this way of operating also, structural height is saved with the tool parts cooperating in the stripping process, and the position of the wire windings in the collecting tool is improved.

The axial drive of form 18 is also used to introduce lock pin 98 into hole 100. Because of the precisely determined position of lock pin 98 there are no problems in exchange of forms, since lock pin 98 then acts as a centering aid.

While in earlier known winding devices the stripper 20 was lowered during the stripping operation with the winding nozzle 22 and the clamping and cutting device 24, the wire length between the last wound windings in the collecting tool and the winding nozzle 22 which remained in the winding plane was of necessity increased. During the first phase of the stripping process, additional wire was pulled from the winding nozzle and in the last phase of the stripping process wire was pulled back from the last windings. The retraction of wire from the winding nozzle leads to an excessive length of wire between the winding nozzle 22 and the clamping and cutting device 24 after the clamping, and from this in turn it can result that the excessively long loop of wire will be caught somewhere or the wire will be ruptured in the next startup of winding nozzle 22. The pulling back of wire from the last windings makes these smaller and results in difficulties and waste in the next collecting operation. These deficiencies are eliminated by the invention principally by elimination of the cause, in that the stripper in the stripping movement at the end of the winding process is moved with the winding nozzle 22 and the clamping and cutting device 24.

What is claimed is:

1. Apparatus for winding electrical windings comprising a winding form, a winding nozzle rotatable about said form for winding wire on said form, a collecting tool for receiving windings from said winding form, means for stripping windings from said form onto said collecting tool, means for clamping a wire between individual winding operations, and means for simultaneously moving said winding nozzle, stripping means and clamping means during stripping of said windings from said form onto said collecting tool.

2. Apparatus according to claim 1 wherein said collecting tool comprises an inner ring of collecting lamellae and a concentrically disposed outer ring of cover strip lamellae wherein said stripping means comprises a stripper member movable along a uniform path to a point adjacent the free ends of said cover strip lamellae.

3. Apparatus according to claim 2 wherein the collecting lamellae are retracted within the cover strip lamellae such that the free ends of the collecting lamellae are positioned immediately above the free ends of the cover strip lamellae.

4. Apparatus according to claim 1 wherein said winding form comprises a multipart form of variable cross section.

5. Apparatus according to claim 4 wherein said winding nozzle is mounted on a transversely movable drive shaft and wherein said apparatus includes means for transversely moving said drive shaft.

6. Apparatus according to claim 5 further including means for varying the width of said winding form comprising means for locking a first part of said winding form in position for engagement with a collecting tool, and means actuated by transverse movement of said drive shaft relative to said first winding form part for moving a further part of said winding form relative to said first form part a distance which is twice the distance moved by said drive shaft whereby the axis of rotation of the winding nozzle drive shaft retains its central position with respect to the winding form.

7. Apparatus according to claim 6 wherein said moving means comprises a transmission gear.

8. Apparatus according to claim 7 wherein said transmission gear comprises a gear which is freely rotatable on said winding nozzle drive shaft, said gear engaging a first rack on said first form part and a further rack on said further form part.

9. Apparatus according to claim 6 wherein said locking means comprises a pin movable axially into said first form part.

10. Apparatus according to claim 6 wherein said winding form comprises clamping means for releasably securing said first and further form parts in position relative to one another.

11. Apparatus according to claim 10 wherein said clamping means are released by a pin movable axially into said first form part.

12. Apparatus according to claim 11 wherein said clamping means comprises a rod secured to said first form part and extending through a pair of plates mounted in said further form part, said plates being urged into a slanted, clamping, position relative to said rod to releasably secure said rod to said further form part and wherein said pin is insertable between said plates to move the plates to a released position transverse to the rod whereby the rod is freely movable within the plates.

13. Apparatus according to claim 1 further comprising means for supplying a first supply of wire to said winding nozzle, means for supplying a second supply of wire to said winding nozzle, and means for joining the end of a first wire supply to the beginning of a second wire supply.

* * * * *